Oct. 22, 1957
P. J. CADE ET AL
2,810,879
PROBE AND VALVE ASSEMBLY
Filed Jan. 4, 1954
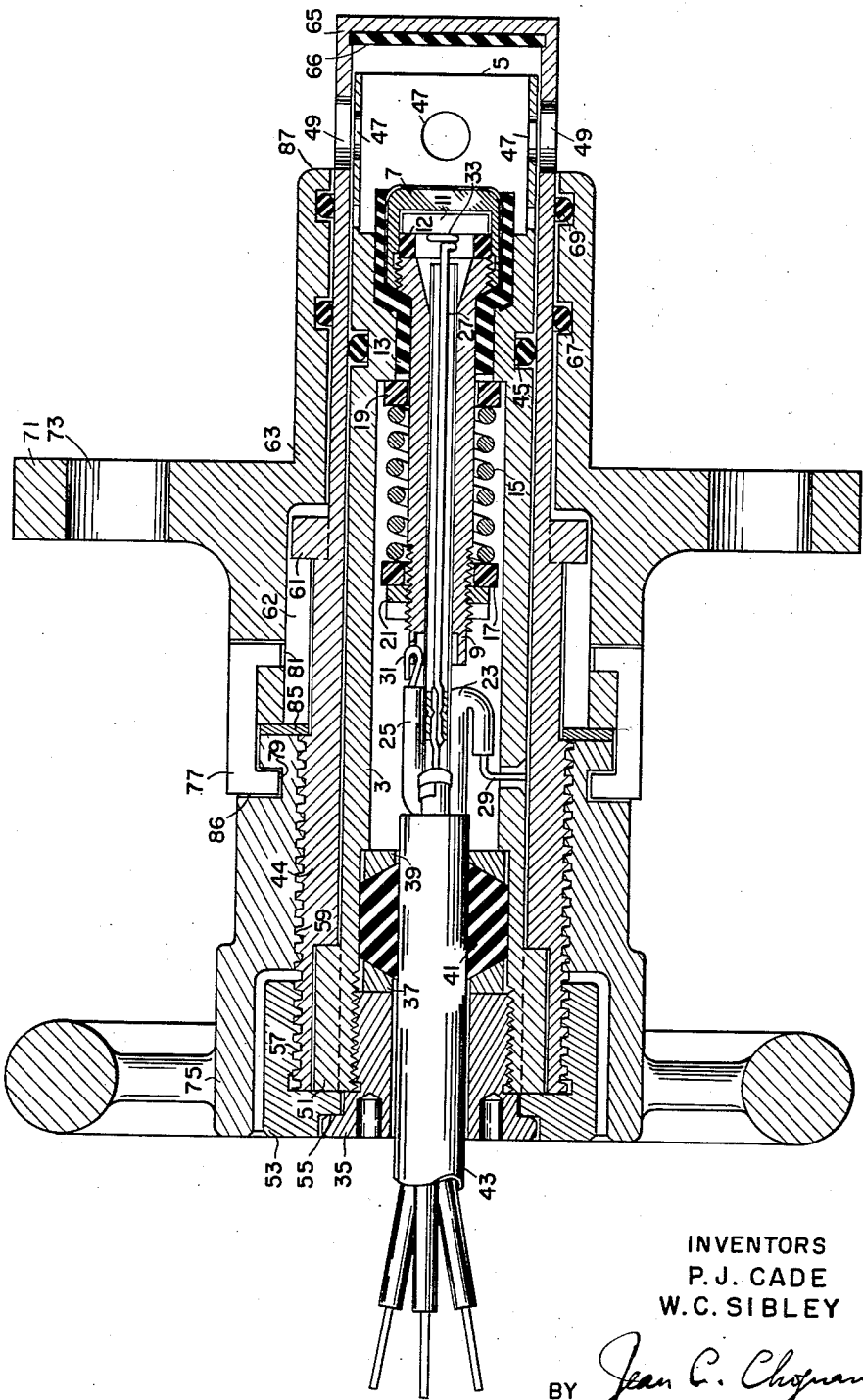
INVENTORS
P. J. CADE
W. C. SIBLEY
BY *Jean C. Chignard*
ATTORNEY

United States Patent Office 2,810,879
Patented Oct. 22, 1957

2,810,879

PROBE AND VALVE ASSEMBLY

Phillip J. Cade, Winchester, and Winfred C. Sibley, Brookline, Mass., assignors to Electronics Corporation of America, a corporation of Massachusetts Application January 4, 1954, Serial No. 401,902

3 Claims. (Cl. 324—30)

This invention relates to the assembly of a probe designed to measure a physical characteristic of a fluid, and of a valve whereby the probe may be readily inserted into and removed, as desired, from a system of pipes or other conduits through which the fluid under test flows, without interfering with the flow of the solution through the system.

In assemblies of the prior art, as shown, for instance, in British Patent No. 260,366 and United States Patent No. 2,533,462, two short pieces of tubing are connected to either side of a gate valve. The outer end of one of these pieces of tubing is adapted to be connected through a T-fitting or the like to the piping system through which the fluid under test flows. When the probe is in the operating position, the gate valve is open and the probe, which is inside the tubing, protrudes into the piping system through which the fluid under test flows. To remove the probe for cleaning and other purposes, it is partly withdrawn past the gate valve, the gate valve is closed, and the probe is then totally withdrawn. In such assemblies the axis of the gate valve is perpendicular to that of the probe, and the probe may be seriously damaged if the gate valve is operated before the probe is partially withdrawn. Such assemblies are also fairly bulky, which is a serious drawback in installations such as submarines in which space is at a premium.

It is an object of this invention to provide a probe and valve assembly which is very compact.

It is another object of this invention to provide a probe and valve assembly in which the operation of the valve cannot damage the probe.

In accordance with the illustrated embodiment of this invention, the axes of the probe and of the valve coincide, and the assembly is thus considerably less bulky than assemblies of the prior art. The probe fits into an inner valve member which is slidable with respect to an outer valve member. When the probe is in the operating position, the valve is open. The valve may be closed by sliding the inner valve member and the probe with respect to the outer valve member, a rotatable valve nut being provided for this purpose. Only when this operation is accomplished can the probe be conveniently removed.

Other and incidental objects of the present invention will be apparent to those skilled in the art from a reading of the following specification and an inspection of the accompanying drawing which shows a sectional view of a probe and valve assembly constructed in accordance with the present invention.

The probe shown in the drawing is a temperature-compensated conductivity probe of a type used to measure the electrical conductivity of fluids whereby quantitative indications of their electrolyte concentration may be obtained. Such probes are used, for instance, in salinity-indicating systems for the condensate systems and distilling plants of seagoing vessels. The probe may, however, be some other instrument, and the temperature-compensated conductivity probe is shown only to illustrate the probe and valve assembly of the present invention.

The probe shown in the drawing is very similar to that described in United States Patent No. 2,611,007, issued September 16, 1952, to P. J. Cade et al. It comprises a metallic probe tube 3 one end of which is the outer electrode 5 of the probe. The metallic inner electrode 7 of the probe is screwed on the inner electrode holder 9. A temperature-compensating resistor 11 is soldered to the inside surface of the inner electrode 7 and insulated from the inner electrode holder 9 by an insulating spacer 12. An insulator 13 provides electrical insulation between the probe tube 3 and the inner electrode 7. This insulator 13 also provides a seal to prevent the fluid under test from leaking into the inner portion of the probe tube 3. This seal is kept tight by the continual force applied to the inner electrode holder 9 through the spring 15 which is compressed between insulating washers 17 and 19 by the slotted nut 21. Electrical connections are made to the outer electrode 5, the inner electrode 7 and the temperature-compensating resistor 11 by conductors 23, 25, and 27 at points 29, 31, and 33, respectively. Conductors 23, 25, and 27 are prevented from applying a pulling force to their respective connections 29, 31, and 33 by a metallic gland nut 35, which when tightened sufficiently, applies a force to gland washers 37 and 39, thereby compressing the resilient packing 41. Packing 41 applies a frictional force to sheath 43 in which conductors 23, 25, and 27 are located, thereby holding these conductors in a fixed position.

The probe tube 3, which is cylindrical in shape, is positioned inside a metallic inner valve member 44. The probe tube 3 is provided with a recess in which an O-ring 45, made of insulating material, is inserted to prevent leakage of the fluid under test between the probe tube 3 and the inner valve member 44. The end of the probe tube 3 which serves as the outside electrode 5 of the probe and the corresponding end of the inner valve member 44 are provided with holes 47 and 49 through which the fluid under test can be allowed to flow and come in contact with the electrodes 5 and 7 of the probe. Keys 51 are provided on the cell tube 3 to prevent the relative rotation of cell tube 3 with respect to the inner valve member 44 and to keep holes 47 in line with holes 49.

A metallic retainer nut 53 is positioned around the gland nut 35. This retainer nut 53 can rotate freely around the gland nut 35, but is prevented from moving along the longitudinal axis of the probe tube 3 by the keys 51 and by a shoulder 55 of the gland nut 35. This retainer nut 53 has a thread 57 which fits onto part of the thread 59 of the inner valve member 44. The inner valve member 44 is provided with keys 61 which slide in keyways 62 and which prevent its rotation with respect to the metallic outer valve member 63. The inner valve member 44 includes a cap portion 65 the inside of which may be covered with a layer 66 of insulating material. Two O-rings 67 and 69 are positioned into recesses in the outer valve member 63 to prevent leakage of the fluid under test between the inner valve member 44 and the outer valve member 63.

The outer valve member 63 includes a flange 71 which is provided with holes 73. The flange 71 is adapted to be bolted to the flange of a T-fitting so that the inner and outer electrodes 5 and 7 of the probe are positioned in the path of the fluid under test which flows in a system of pipes or other conduits.

A metallic valve nut 75 is screwed on the thread 59 of the inner valve member 44. The valve nut 75 and the outer valve member 63 are held together by means of a clamp or split collar 77 which fits into grooves 79 and 81 of the valve nut 75 and of the outer valve member 63, respectively. Screws (not shown), which thread into the outer valve member 63, are provided to hold the split collar 77 in place. The valve nut 75 is free to rotate about the longitudinal axis of the probe while the outer valve member 63 remains fixed. A chrome-plated brass washer 85 provides a smooth surface for the rotation of the valve nut 75.

The drawing shows the probe in its normal operating position, i. e., protruding from the valve and allowing the fluid under test to flow through the holes 47 and 49. To close the valve the valve nut 75 is turned clockwise. This rotation of the valve nut 75 applies a pressure on the surface 86 of the split collar 77, and the whole probe together with the retainer nut 53 and the inner valve member 44 move along the longitudinal axis of the probe until the cap portion 65 of the inner valve member 44 is approximately in line with the shoulder 87 of the outer valve member 63. This closes the valve, and the retainer nut 53 now protrudes away from the valve nut 75. The probe can then be removed by turning the retainer nut 53 in a counter-clockwise direction. These operations are reversed to put the probe back into the valve and place it in operating position.

When the valve is closed, a small amount of fluid, which may be under pressure, is trapped into the space between the inner electrode 7 and the cap portion 65. The O-ring 67 is so positioned that when the valve is closed the hole 49 in the inner valve member spans O-ring 67. The trapped fluid can thus seep into the unsealed volume between the inner valve member 44 and the split collar 77. There is then no difficulty in putting the probe back into its operating position inside the valve after its removal for cleaning or other purposes.

The valve members may be made of brass, and the insulating parts may be made of a resilient plastic such as Teflon.

The probe and valve assembly of the present invention, besides being more compact than those of the prior art, has the added advantage that the probe cannot be damaged by the premature closing of the valve. Furthermore, the probe cannot be conveniently removed until the valve is closed, thus providing an added safety feature when the fluids under test are at high temperatures and/or under high pressures.

What is claimed is:

1. A probe and valve assembly comprising: a hollow outer valve member including a keyway, a hollow inner valve member slidable into said outer valve member, said inner valve member having an external thread at one end thereof, a perforated portion and a cap portion at the other end thereof and a key engageable in the keyway of said outer valve member, a probe slidable into said inner valve member, a retainer nut mounted on said probe and having an inner thread engageable over the external thread of said inner valve member, means to open and close said valve by moving the perforated portion of said inner valve member beyond or within said outer valve member, said last-named means comprising a rotatable valve nut having an inner thread engageable over the external thread of said inner valve member, and clamping means to hold together said valve nut and said outer valve member.

2. A valve assembly including a housing adapted to be mounted on and in communication with a liquid flow conduit containing a liquid to be tested, a valve including a tubular member reciprocably mounted in said housing for reciprocation to and from closed position, a testing apparatus removably mounted in said tubular member for reciprocation therewith, manually operable means for releasably locking said testing apparatus within said tubular member, said means being movable with the tubular member and the testing apparatus in their reciprocation to and from closed position of the valve, and further means fixed against reciprocation and positioned to shield and prevent access to said manually operable means when the valve is in open position.

3. A valve and conductivity cell assembly including in combination, a housing adapted to be mounted on and in communication with a liquid flow conduit containing a liquid to be tested, a tubular member mounted in said housing for axial movement therein to open position with the forward portion thereof projected into the liquid flow conduit and to retracted closed position, said tubular member provided with means co-active with said housing to prevent entry of the liquid under test into the tubular member when in retracted closed position, the tubular member having openings in the circumferential wall of the forward portion thereof, and means for causing axial movement of said tubular member within said housing including an external threaded section on said tubular member, an element threaded on said threaded section for rotation relative to the tubular member, said element including a forward nut portion and a rearward sleeve portion, and further means restraining said element against axial movement relative to said tubular member, said further means including a clamping ring fixed to said housing and rotatively fixed to said element and extending between said housing and element and circumferentially thereabout, and a conductivity cell removably mounted in the tubular member for axial movement therewith and having a part thereof positioned within that area of the tubular member defined by the circumferential wall having the openings therein for contact of said part with the liquid entering through the openings, manually operable means for releasably locking said conductivity cell within said tubular member, and said manually operable means disposed in inaccessible position within said sleeve portion of said element when the tubular member is in projected open position.

References Cited in the file of this patent
UNITED STATES PATENTS

| | | |
|---|---|---|
| 1,670,640 | Smith | May 22, 1928 |
| 2,234,056 | Moore | Mar. 4, 1941 |
| 2,533,462 | Ingram | Dec. 12, 1950 |
| 2,713,989 | Bryant | July 26, 1955 |